(12) United States Patent
Uematsu et al.

(10) Patent No.: US 9,000,694 B2
(45) Date of Patent: Apr. 7, 2015

(54) SYNCHRONOUS MOTOR CONTROL APPARATUS

(71) Applicant: Fanuc Corporation, Yamanashi (JP)

(72) Inventors: Hidetoshi Uematsu, Yamanashi (JP); SeungJun Lee, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/780,237

(22) Filed: Feb. 28, 2013

(65) Prior Publication Data
US 2013/0249449 A1 Sep. 26, 2013

(30) Foreign Application Priority Data
Mar. 23, 2012 (JP) .................. 2012-067460

(51) Int. Cl.
H02P 21/00 (2006.01)
(52) U.S. Cl.
CPC .................. H02P 21/0096 (2013.01)
USPC .................. 318/400.02; 318/400.01
(58) Field of Classification Search
USPC ............ 318/432, 434, 400.01, 400.02, 727
See application file for complete search history.

(56) References Cited

U.S. PATENT DOCUMENTS

| | | | |
|---|---|---|---|
| 5,652,495 A * | 7/1997 | Narazaki et al. | 318/716 |
| 5,877,603 A | 3/1999 | Uchida et al. | |
| 6,936,991 B2 * | 8/2005 | Chen et al. | 318/700 |
| 7,586,286 B2 * | 9/2009 | Cheng et al. | 318/807 |
| 2008/0030163 A1 | 2/2008 | Fukuchi et al. | |
| 2010/0277111 A1 | 11/2010 | Kitanaka | |
| 2011/0162554 A1 | 7/2011 | Galic | |
| 2011/0241584 A1 * | 10/2011 | He et al. | 318/400.09 |

FOREIGN PATENT DOCUMENTS

| | | |
|---|---|---|
| EP | 1 612 929 | 6/2005 |
| JP | 9-84400 | 3/1997 |
| JP | 2003-052199 | 2/2003 |
| JP | 2006-20397 | 1/2006 |
| JP | 2008061445 A | 3/2008 |

(Continued)

OTHER PUBLICATIONS

Office Action mailed Jun. 25, 2013 corresponds to Japanese patent application No. 2013-056423.
Morimoto and etc., "Motor Parameters and Operating Limits of PM Motor", IEEJ Transactions on Industry Applications, 1990, vol. 110-d, No. 11, pp. 1171 to 1176.

(Continued)

*Primary Examiner* — Rina Duda
(74) *Attorney, Agent, or Firm* — Lowe Hauptman & Ham

(57) ABSTRACT

A control apparatus includes, a first calculating unit which calculates first d-phase and q-phase current limit candidate values, a second calculating unit which calculates second d-phase and q-phase current limit candidate values, a q-phase unit which, when the absolute value of the first d-phase current limit candidate value is smaller than that of the second d-phase current limit candidate value, sets the first q-phase current limit candidate value as a q-phase current limit value, but otherwise sets the second q-phase current limit candidate value as the q-phase current limit value, and a d-phase unit which, when the absolute value of the first d-phase current limit candidate value is smaller than that of the second d-phase current limit candidate value, sets the first d-phase current limit candidate value as a d-phase current limit value, but otherwise sets the second d-phase current limit candidate value as the d-phase current limit value.

7 Claims, 6 Drawing Sheets

(56) References Cited

FOREIGN PATENT DOCUMENTS

| | | |
|---|---|---|
| JP | 2008-086138 | 4/2008 |
| WO | 2008/038338 | 4/2008 |

OTHER PUBLICATIONS

Cheng, B. et al., "Torque Feedforward Control Technique for Permanent-Magnet Synchronous Motors", IEEE Transactions on Industrial Electronics, vol. 57, No. 3, Mar. 2010, pp. 969-974.

* cited by examiner

SYNCHRONOUS MOTOR CONTROL APPARATUS

RELATED APPLICATIONS

The present application is based on, and claims priority from, Japanese Application Number 2012-067460, filed Mar. 23, 2012, the disclosure of which is hereby incorporated by reference herein in its entirety.

BACKGROUND OF THE INVENTION

1. Field of the Invention

The present invention relates to a control apparatus for a permanent-magnet synchronous motor, and more particularly to a synchronous motor control apparatus that performs current vector control of a permanent-magnet synchronous motor based on q-phase and d-phase current commands.

2. Description of the Related Art

Current vector control is known in the art as a method for controlling a three-phase permanent-magnet synchronous motor by using q-phase and d-phase current commands. FIG. 7 is a schematic diagram for explaining how the q-phase and d-phase current commands used for vector current control of a synchronous motor are related to three-phase current commands. In a control apparatus for controlling the three-phase permanent-magnet synchronous motor 3, a current vector control block 51 takes as inputs the q-phase current command $i_q$ and d-phase current command $i_d$ created based on a torque command to the synchronous motor 3, the motor speed fed back from the synchronous motor 3, etc., and creates a q-phase current command $i_q^*$ and a d-phase current command $i_d^*$ for achieving desired current vector control. A DQ/three-phase conversion block 52 performs a two-phase to three-phase conversion to convert the q-phase current command $i_q^*$ and d-phase current command $i_d^*$ to current commands $i_u^*$, $i_v^*$, and $i_w^*$ for the u-phase, v-phase, and w-phase, respectively, of the synchronous motor 3. Usually, the synchronous motor 3 is driven by an inverter apparatus (not shown), and the three-phase current commands $i_u^*$, $i_v^*$, and $i_w^*$ output from the DQ/three-phase conversion block 52 are used as switching commands for controlling the switching operations of semiconductor switching devices provided in the inverter apparatus for the respective phases. The inverter apparatus supplies drive power to the respective phase windings of the synchronous motor 3 by performing the switching operations based on the three-phase current commands $i_u^*$, $i_v^*$, and $i_w^*$.

FIG. 8 is a vector diagram for explaining voltages generated in a permanent-magnet synchronous motor. More specifically, on a d-q current coordinate plane, an induced voltage $\omega\Psi_a$, which depends on the flux linkage $\Psi_a$ of the permanent magnet and the electrical angular speed $\omega$ of the synchronous motor (hereinafter simply referred to as the "motor speed") when the permanent-magnet synchronous motor is rotated at high speed, and a voltage $\omega L_q i_q$, which depends on the motor speed $\omega$ and the q-axis inductance $L_q$ and q-phase current $i_q$ of the synchronous motor, are generated. If their sum voltage V exceeds the voltage limit value $V_{om}$ preset in the control apparatus, as shown in FIG. 8, a drive voltage deficient situation occurs, resulting in an inability to rotate the synchronous motor.

FIG. 9 is a vector diagram for explaining a servo motor current control method disclosed in Japanese Unexamined Patent Publication No. H09-084400. According to the method disclosed in Japanese Unexamined Patent Publication No. H09-084400, which achieves high-speed rotation of the synchronous motor by solving the above motor drive voltage deficiency problem, the d-phase current $i_d$ is caused to flow, for example, in the negative direction of the d-axis to generate a voltage $\omega L_d i_d$ that depends on the motor speed $\omega$, d-axis inductance $L_d$, and d-phase current $i_d$, thereby reducing the motor drive voltage so that the voltage limit value $V_{om}$ preset in the control apparatus will not be exceeded.

It is also well known that motor drive voltage deficiency can be addressed by "flux weakening control", as described in "Design and Control of Interior Permanent Magnet Synchronous Motor" by Yoji Takeda, Nobuyuki Matsui, Shigeo Morimoto, and Yukio Honda and published by Ohmsha, first edition, fourth printing, pp. 17-27 and 38-46, 2007. According to the document "Design and Control of Interior Permanent Magnet Synchronous Motor", when the motor speed of the synchronous motor is denoted by $\omega$, armature flux linkage by $\Psi_a$, q-axis and d-axis inductances by $L_q$ and $L_d$, respectively, the voltage limit value preset in the control apparatus by $V_{om}$, the q-phase current by $i_q$, the d-phase current by $i_d$, and the induced voltage by $V_o$, and when the induced voltage $V_o$ is held at the voltage limit value $V_{om}$, the relation defined by the following equation (1) is obtained.

$$(L_d i_d + \Psi_a)^2 + (L_q i_q)^2 = \left(\frac{V_{om}}{\omega}\right)^2 \tag{1}$$

In the flux weakening control, when the motor speed $\omega$ of the synchronous motor and the q-phase current command $i_q$ are given, the d-phase current command $i_d$ is expressed as shown by the following equation (2).

$$i_d = \frac{-\Psi_a + \sqrt{\left(\frac{V_{om}}{\omega}\right)^2 - (L_q i_q)^2}}{L_d} \tag{2}$$

The flux control given by the above equation (2) can consider the voltage limit but cannot consider the current limit. If both the voltage limit and the current limit are to be considered, one possible solution is to employ a control method, such as described in the document "Design and Control of Interior Permanent Magnet Synchronous Motor", that switches the control mode according to the motor speed $\omega$ of the synchronous motor. FIG. 10 is a schematic diagram for explaining the method of controlling the synchronous motor having a plurality of control modes described in the document "Design and Control of Interior Permanent Magnet Synchronous Motor". According to the description given in the document "Design and Control of Interior Permanent Magnet Synchronous Motor", if maximum output control that obtains maximum output by considering the voltage and current limits is to be achieved, the current vector must be controlled appropriately according to the motor speed $\omega$ of the synchronous motor. More specifically, a speed judging unit 53 that judges the motor speed $\omega$ of the synchronous motor is provided within the synchronous motor control apparatus, and when the motor speed $\omega$ is not greater than the "base speed $\omega_{base}$ that reaches the voltage limit value", the q-phase current command $i_q$ and the d-phase current command $i_d$ are created based on a control mode I that maximizes torque by considering only the current limit; on the other hand, when the motor speed $\omega$ is greater than the base speed $\omega_{base}$ but not greater than a predetermined high speed $\omega_d$, the current commands are created based on a control mode II that maximizes torque by considering both the current limit and the voltage limit, and when the motor speed ω is greater than the predetermined high speed $\omega_d$, the current commands are created based on a control mode III that maximizes torque by considering only the voltage limit.

As a method similar to the above flux weakening control, a control method that varies the d-phase current according to the torque command is disclosed, for example, in Japanese Unexamined Patent Publication No. 2003-052199. According to this control method, a maximum load d-phase current command value that controls the motor terminal voltage at maximum load to within the maximum output voltage of the motor control apparatus and a minimum load d-phase current command value that controls the motor terminal voltage at no load to within the maximum output voltage of the motor control apparatus are obtained according to the number of revolutions of the motor, and a value interpolated from these two d-phase current command values according to the magnitude of the torque command is taken as the d-phase current command.

On the other hand, Japanese Unexamined Patent Publication No. 2006-020397, for example, discloses a method for controlling a permanent-magnet synchronous motor, in which the AC supply voltage to be input to a power amplifier or the DC link voltage obtained by rectifying the input voltage is measured, and the reactive current (d-axis current) or the amount by which to advance the current control phase is varied according to the supply voltage, thereby directly controlling the reactive current or phase in accordance with the variation of the input supply voltage.

Further, there are proposed several methods that impose a limit on the d-axis current command in accordance with motor speed by using a prescribed mathematical equation, for example, as disclosed in Japanese Unexamined Patent Publication No. 2008-086138.

There is also proposed a control method, such as disclosed in WO 2008/038338, that achieves the maximum torque/current control described in the document "Design and Control of Interior Permanent Magnet Synchronous Motor" through calculations using approximate equations.

According to the control method that switches the control mode according to the motor speed ω of the synchronous motor, as described in the document "Design and Control of Interior Permanent Magnet Synchronous Motor", the base speed $\omega_{base}$ and the speed $\omega_d$ by reference to which the mode is switched between control mode II and control mode III are predicted and set in advance, and the q-phase current command and the d-phase current command are computed independently by switching the control mode. This gives rise to the problem that if the base speed $\omega_{base}$ and the speed $\omega_d$ were not correctly predicted, current flow would be interrupted when switching the control mode, causing the synchronous motor to vibrate.

Furthermore, the mathematical equation such as equation (1), which involves operations such as the calculation of the square root and divisions, makes the program complex, and the computation speed is slow. It is therefore difficult to operate the synchronous motor control apparatus with a short control period, and hence it is difficult to enhance the controllability of the permanent-magnet synchronous motor.

SUMMARY OF THE INVENTION

In view of the above problems, it is an object of the present invention to provide a synchronous motor control apparatus that can control a permanent-magnet synchronous motor in a stable manner by creating at high speed the q-phase and d-phase current commands used for current vector control of the synchronous motor.

To achieve the above object, according to a first mode of the invention, there is provided a synchronous motor control apparatus that performs current vector control of a permanent-magnet synchronous motor based on a q-phase current command and a d-phase current command, including, a first candidate value calculating unit which, using the motor speed of the synchronous motor and a control apparatus current limit value and control apparatus voltage limit value preset in the control apparatus, calculates a first d-phase current limit candidate value and a first q-phase current limit candidate value, based on points of intersection at which a current limiting circle representing a current vector locus that the control apparatus current limit value describes on a d-q current coordinate plane intersects a voltage limiting ellipse representing a current vector locus that the control apparatus voltage limit value describes as a function of the motor speed, a second candidate value calculating unit which, using the motor speed of the synchronous motor and the control apparatus voltage limit value, calculates a second d-phase current limit candidate value and a second q-phase current limit candidate value, based on points of intersection at which a maximum torque/flux curve representing a current vector locus that maximizes torque for the same flux linkage on the d-q current coordinate plane intersects the voltage limiting ellipse representing the current vector locus that the control apparatus voltage limit value describes as a function of the motor speed, a q-phase current command unit which, when the absolute value of the first d-phase current limit candidate value is smaller than the absolute value of the second d-phase current limit candidate value, then sets the first q-phase current limit candidate value as a q-phase current limit value, but otherwise sets the second q-phase current limit candidate value as the q-phase current limit value and, when the q-phase current command created based on a torque command exceeds the q-phase current limit value, then limits the q-phase current command to the q-phase current limit value and outputs the thus limited q-phase current command, and a d-phase current command unit which, when the absolute value of the first d-phase current limit candidate value is smaller than the absolute value of the second d-phase current limit candidate value, then sets the first d-phase current limit candidate value as a d-phase current limit value, but otherwise sets the second d-phase current limit candidate value as the d-phase current limit value and, when the d-phase current command created based on the motor speed and the q-phase current command exceeds the d-phase current limit value, then limits the d-phase current command to the d-phase current limit value and outputs the thus limited d-phase current command.

According to a second mode of the invention, there is provided a synchronous motor control apparatus that performs current vector control of a permanent-magnet synchronous motor based on a q-phase current command and a d-phase current command, including, a first candidate value calculating unit which, using the motor speed of the synchronous motor and a control apparatus current limit value and control apparatus voltage limit value preset in the control apparatus, calculates a first d-phase current limit candidate value and a first q-phase current limit candidate value, based on points of intersection at which a current limiting circle representing a current vector locus that the control apparatus current limit value describes on a d-q current coordinate plane intersects a voltage limiting ellipse representing a current vector locus that the control apparatus voltage limit value describes as a function of the motor speed, a second candidate value calculating unit which, using the motor speed of the synchronous motor and the control apparatus voltage limit value, calculates a second d-phase current limit candidate value and a second q-phase current limit candidate value, based on points of intersection at which a maximum torque/flux curve representing a current vector locus that maximizes torque for the same flux linkage on the d-q current coordinate plane intersects the voltage limiting ellipse representing the current vector locus that the control apparatus voltage limit value describes as a function of the motor speed, a first q-phase current command unit which, when the absolute value of the first d-phase current limit candidate value is smaller than the absolute value of the second d-phase current limit candidate value, then sets the first q-phase current limit candidate value as a q-phase current limit value, but otherwise sets the second q-phase current limit candidate value as the q-phase current limit value and, when a first q-phase current command candidate value created based on a torque command exceeds the q-phase current limit value, then limits the first q-phase current command candidate value to the q-phase current limit value and outputs the thus limited first q-phase current command candidate value, a first d-phase current command unit which, when the absolute value of the first d-phase current limit candidate value is smaller than the absolute value of the second d-phase current limit candidate value, then sets the first d-phase current limit candidate value as a d-phase current limit value, but otherwise sets the second d-phase current limit candidate value as the d-phase current limit value and, when a first d-phase current command candidate value created based on the motor speed and the first q-phase current command exceeds the d-phase current limit value, then limits the first d-phase current command candidate value to the d-phase current limit value and outputs the thus limited first d-phase current command candidate value, a third candidate value calculating unit which calculates a third d-phase current limit candidate value and a third q-phase current limit candidate value, based on points of intersection at which a maximum torque/current curve representing a current vector locus that maximizes generated torque for the same current on the d-q current coordinate plane intersects the current limiting circle representing the current vector locus that the control apparatus current limit value describes, a second q-phase current command unit which, when a second q-phase current command candidate value created based on the torque command exceeds the third q-phase current limit candidate value, then limits the second q-phase current command candidate value to the third q-phase current limit value and outputs the thus limited second q-phase current command candidate value, a second d-phase current command unit which outputs a second d-phase current command candidate value that is created by using the second q-phase current command candidate value output from the second q-phase current command unit and the maximum torque/current curve representing on the d-q current coordinate plane the current vector locus that maximizes generated torque for the same current, and a d-q phase current command judging unit which, when the absolute value of the second d-phase current command candidate value is larger than the absolute value of the first d-phase current command candidate value, then outputs the second d-phase current command candidate value and the second q-phase current command candidate value, otherwise outputs the first d-phase current command candidate value and the first q-phase current command candidate value, as the d-phase current command and the q-phase current command, respectively.

In the first mode of the invention, the second d-phase current command unit may calculate the second d-phase current command candidate value in accordance with an approximate equation expressed as a quadratic function whose variable is the second q-phase current command candidate value output from the second q-phase current command unit.

In the first and second mode of the invention, the first candidate value calculating unit and the second candidate value calculating unit may calculate the first d-phase current limit candidate value, the first q-phase current limit candidate value, and the second q-phase current limit candidate value, respectively, in accordance with an approximate equation expressed as a quadratic function whose variable is the motor speed of the synchronous motor.

In the first and second mode of the invention, the control apparatus may further include a coefficient setting unit which sets coefficients to be used in a function expressed by the approximate equation, in response to an input voltage supplied to the synchronous motor and detected by a voltage detection sensor provided at a power input terminal of the synchronous motor.

Alternatively, the control apparatus may further include a coefficient setting unit which sets coefficients to be used in a function expressed by the approximate equation, in response to the temperature of the synchronous motor detected by a temperature sensor provided in the vicinity of the synchronous motor.

BRIEF DESCRIPTION OF THE DRAWINGS

The present invention will be more clearly understood with reference to the following accompanying drawings.

DETAILED DESCRIPTION

A synchronous motor control apparatus will be described below with reference to the drawings. It should, however, be understood that the present invention is not limited to the accompanying drawings, nor is it limited to the specific embodiments described herein.

A synchronous motor control apparatus that performs current vector control of a permanent-magnet synchronous motor based on q-phase and d-phase current commands created based on a torque command to the synchronous motor and the motor speed of the synchronous motor will be described below in accordance with first and second embodiments.

Figure 1:
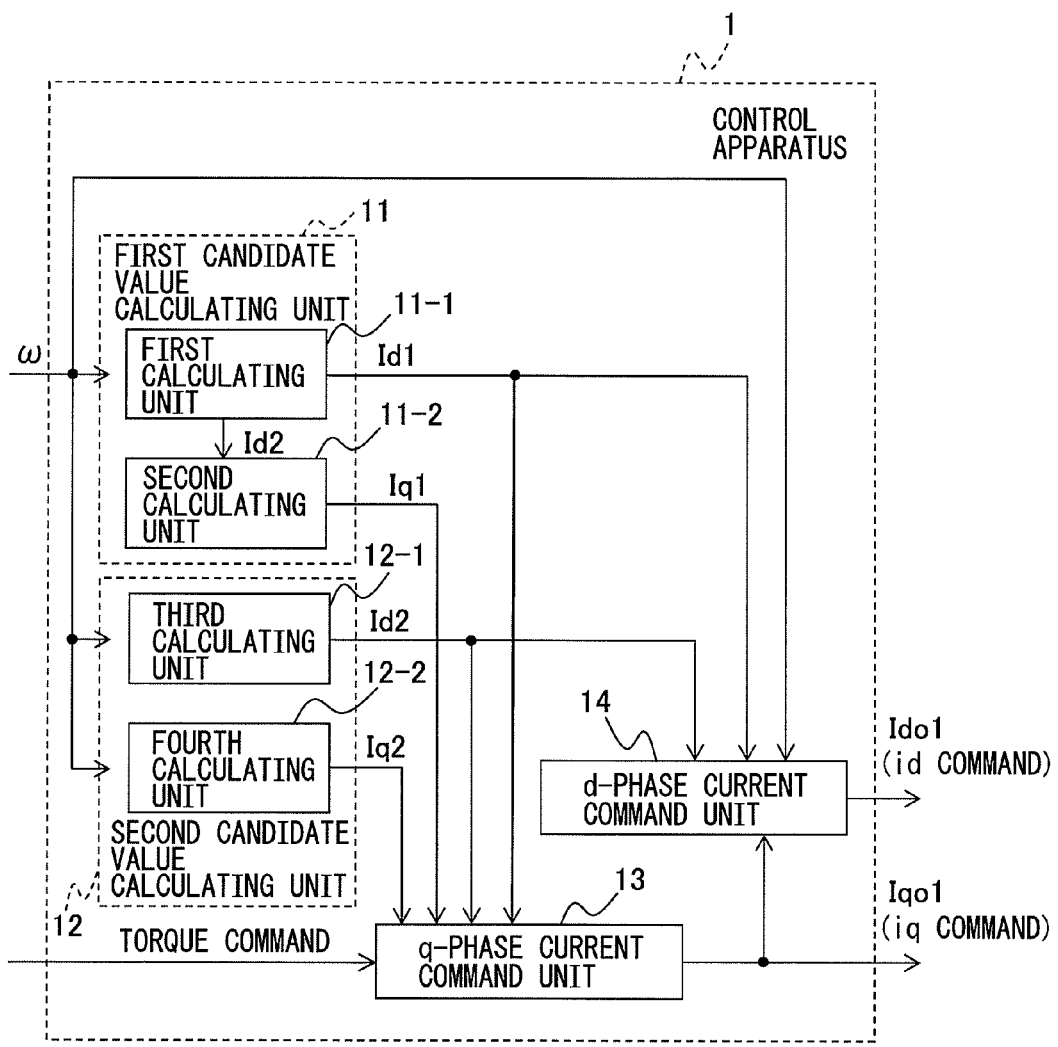
FIG. 1 is a basic functional block diagram of a synchronous motor control apparatus according to a first embodiment.

FIG. 1 is a basic functional block diagram of the synchronous motor control apparatus according to the first embodiment.

The synchronous motor control apparatus 1 that performs current vector control of the permanent-magnet synchronous motor based on the q-phase and d-phase current commands according to the first embodiment includes: a first candidate value calculating unit 11 which calculates a first d-phase current limit candidate value and a first q-phase current limit candidate value by using the motor speed of the synchronous motor (not shown) and a control apparatus current limit value and control apparatus voltage limit value preset in the control apparatus 1; a second candidate value calculating unit 12 which calculates a second d-phase current limit candidate value and a second q-phase current limit candidate value by using the motor speed of the synchronous motor and the control apparatus voltage limit value; a q-phase current command unit 13 which, if the absolute value of the first d-phase current limit candidate value is smaller than the absolute value of the second d-phase current limit candidate value, then sets the first q-phase current limit candidate value as a q-phase current limit value, but otherwise sets the second q-phase current limit candidate value as the q-phase current limit value and, if the q-phase current command created based on the torque command exceeds the q-phase current limit value, then limits the q-phase current command to the q-phase current limit value and outputs the thus limited q-phase current command; and a d-phase current command unit 14 which, if the absolute value of the first d-phase current limit candidate value is smaller than the absolute value of the second d-phase current limit candidate value, then sets the first d-phase current limit candidate value as a d-phase current limit value, but otherwise sets the second d-phase current limit candidate value as the d-phase current limit value and, if the d-phase current command created based on the motor speed and the q-phase current command exceeds the d-phase current limit value, then limits the d-phase current command to the d-phase current limit value and outputs the thus limited d-phase current command. The q-phase current command and the d-phase current command output from the q-phase current command unit 13 and the d-phase current command unit 14, respectively, are thereafter converted to three-phase current commands. The three-phase current commands are sent to an inverter apparatus that drives the synchronous motor, and based on the received current commands, the inverter apparatus controls the switching operations of its internal semiconductor switching devices to generate desired three-phase drive power which is supplied to the synchronous motor.

The control apparatus current limit value corresponds to the maximum allowable current of the motor or the inverter apparatus. On the other hand, the control apparatus voltage limit value corresponds to the maximum voltage that the inverter apparatus that drives the synchronous motor can output, and depends on the DC link voltage on the DC side of the inverter apparatus. The various component elements will be described below.

The first candidate value calculating unit 11 shown in FIG. 1 calculates the first d-phase current limit candidate value and the first q-phase current limit candidate value, based on points of intersection at which a current limiting circle representing a current vector locus that the control apparatus current limit value describes on a d-q current coordinate plane intersects a voltage limiting ellipse representing a current vector locus that the control apparatus voltage limit value describes as a function of the motor speed.

According to the document "Design and Control of Interior Permanent Magnet Synchronous Motor", the current vector locus that the control apparatus current limit value $I_{am}$ describes on the d-q current coordinate plane is a current limiting circle given by the following equation (3)

$$i_d^2 + i_Q^2 = I_{am}^2 \qquad (3)$$

According to the document "Design and Control of Interior Permanent Magnet Synchronous Motor", the current vector locus that the control apparatus voltage limit value $V_{om}$ describes on the d-q current coordinate plane is a voltage limiting ellipse given by the following equation (4)

$$(L_d i_d + \Psi_a)^2 + (L_q i_q)^2 = \left(\frac{V_{om}}{\omega}\right)^2 \qquad (4)$$

When the motor speed of the synchronous motor is denoted by $\omega$, armature flux linkage by $\Psi_a$, q-axis and d-axis inductances by $L_q$ and $L_d$, respectively, the control apparatus voltage limit value by $V_{om}$, and the control apparatus current limit value by $I_{am}$, the first candidate value calculating unit 11 calculates the first d-phase current limit candidate value $I_{d1}$ and the first q-phase current limit candidate value $I_{q1}$ on the d-q current coordinate plane, based on the points of intersection where the current limiting circle representing the current vector locus that the control apparatus current limit value $I_{am}$ describes on the d-q current coordinate plane intersects the voltage limiting ellipse representing the current vector locus that the control apparatus voltage limit value $V_{om}$ describes as a function of the motor speed $\omega$. The following equation (5) is obtained from the equations (3) and (4).

$$I_{d1} = \frac{\Psi_a L_d - \sqrt{(\Psi_a L_d)^2 + (L_q^2 - L_d^2)\left\{\Psi_a^2 + (L_q I_{am})^2 - \left(\frac{V_{om}}{\omega}\right)^2\right\}}}{L_q^2 - L_d^2} \qquad (5)$$

A first calculating unit 11-1 in the first candidate value calculating unit 11 calculates the first d-phase current limit candidate value $I_{d1}$ in accordance with the equation (5).

On the other hand, a second first calculating unit 11-2 in the first candidate value calculating unit 11 calculates the first q-phase current limit candidate value $I_{q1}$ in accordance with the following equation (6) generated by transforming the equation (5).

$$I_{Q1} = \sqrt{I_{am}^2 - I_{d1}^2} \tag{6}$$

The second candidate value calculating unit 12 shown in FIG. 1 calculates the second d-phase current limit candidate value and the second q-phase current limit candidate value, based on points of intersection at which a maximum torque/flux curve representing a current vector locus that maximizes torque for the same flux linkage on the d-q current coordinate plane intersects the voltage limiting ellipse representing the current vector locus that the control apparatus voltage limit value describes as a function of the motor speed.

According to the document "Design and Control of Interior Permanent Magnet Synchronous Motor", the flux linkage $\Psi_o$ of the permanent-magnet synchronous motor ($\Psi_{od}$ and $\Psi_{oq}$ on the d-q current coordinate plane) is expressed as shown by the following equations (7) and (8).

$$\begin{bmatrix} \Psi_{od} \\ \Psi_{oq} \end{bmatrix} = \begin{bmatrix} L_d & 0 \\ 0 & L_q \end{bmatrix} \begin{bmatrix} i_d \\ i_q \end{bmatrix} + \begin{bmatrix} \Psi_a \\ 0 \end{bmatrix} \tag{7}$$

$$\Psi_0 = \sqrt{\Psi_{od}^2 + \Psi_{oq}^2} = \sqrt{(L_d i_d + \Psi_a)^2 + (L_q i_q)^2} \tag{8}$$

Further, according to the document "Design and Control of Interior Permanent Magnet Synchronous Motor", the torque T of the permanent-magnet synchronous motor is expressed as shown by the following equation (9), where $T_m$ is the magnet torque and $T_r$ is the reluctance torque.

$$T = P_n\{\Psi_a i_q + (L_d - L_q) i_d i_q\} \tag{9}$$
$$= P_n\{\Psi I_a \cos\beta + \frac{1}{2}(L_q - L_d) I_a^2 \sin 2\beta\}$$
$$= T_m + T_r$$

wherein, $$T_m = P_n \Psi_a i_q = P_n \Psi_a I_a \cos\beta$$

$$T_r = P_n(L_d - L_q) i_d i_q = \frac{P_n}{2}(L_q - L_d) I_a^2 \sin 2\beta$$

The q-phase current $i_q$ is eliminated from equation (9) by using the equation (8) representing the flux linkage $\Psi_o$, and the torque T is expressed using the d-phase current $i_d$ and the flux linkage $\Psi_o$; then, setting $\partial T/\partial i_d = 0$, the condition that minimizes the flux linkage for the same torque can be expressed as shown by the following equations (10), (11), and (12). This is also the condition that maximizes the torque for the same flux linkage.

$$i_d = -\frac{\Psi_a + \Delta\Psi_d}{L_d} \tag{10}$$

$$i_q = \frac{\sqrt{\Psi_o^2 - \Delta\Psi_d^2}}{L_q} \tag{11}$$

$$\Delta\Psi_d = \frac{-L_q \Psi_a + \sqrt{(L_q \Psi_a)^2 + 8(L_q - L_d)^2 \Psi_o^2}}{4(L_q - L_d)} \tag{12}$$

Substituting $\Psi_o = V_{om}/\omega$ in the above equations (10), (11), and (12) and expressing them as a function of the motor speed $\omega$, the following equations (13), (14), and (15) are obtained.

$$\Delta\Psi_d = \frac{-L_q \Psi_a + \sqrt{(L_q \Psi_a)^2 + 8(L_q - L_d)^2 \left(\frac{V_{om}}{\omega}\right)^2}}{4(L_q - L_d)} \tag{13}$$

$$I_{d2} = -\frac{\Psi_a + \Delta\Psi_d}{L_d} \tag{14}$$

$$I_{q2} = \frac{\sqrt{\left(\frac{V_{om}}{\omega}\right)^2 - (\Delta\Psi_d)^2}}{L_q} \tag{15}$$

When the relations of the above equations (13), (14), and (15) are defined on the d-q current coordinate plane, a curve is generated. This curve represents the current vector locus that maximizes torque for the same flux linkage, and herein is referred to as the "maximum torque/flux curve".

The second candidate value calculating unit 12 calculates the second d-phase current limit candidate value $I_{d2}$ and the second q-phase current limit candidate value $I_{q2}$ on the d-q current coordinate plane, based on points of intersection where the maximum torque/flux curve representing the current vector locus that maximizes torque for the same flux linkage on the d-q current coordinate plane intersects the voltage limiting ellipse representing the current vector locus that the control apparatus voltage limit value $V_{om}$ describes as a function of the motor speed $\omega$.

A third calculating unit 12-1 in the second candidate value calculating unit 12 calculates the second d-phase current limit candidate value $I_{d2}$ in accordance with the equations (13) and (14).

A fourth calculating unit 12-2 in the second candidate value calculating unit 12 calculates the second q-phase current limit candidate value $I_{q2}$ in accordance with the equation (15).

The q-phase current command unit 13 shown in FIG. 1 creates the q-phase current command $i_q$ based on the torque command. In the first embodiment, the q-phase current limit value $I_{qo1}$, that the q-phase current command unit 13 uses when creating the q-phase current command $i_q$ is selected from among the first q-phase current limit candidate value $I_{q1}$ and the second q-phase current limit candidate value $I_{q2}$. A determination as to which candidate value is to be selected is made based on the first d-phase current limit candidate value $I_{d1}$ and the second d-phase current limit candidate value $I_{d2}$. More specifically, the q-phase current command unit 13 compares the first d-phase current limit candidate value $I_{d1}$ and the second d-phase current limit candidate value $I_{d2}$, and if the absolute value of the first d-phase current limit candidate value $I_{d1}$ is smaller than the absolute value of the second d-phase current limit candidate value $I_{d2}$, the first q-phase current limit candidate value $I_{q1}$ is selected as the q-phase current limit value $I_{qo1}$ to be used when creating the q-phase current command $i_q$. On the other hand, if the absolute value of the first d-phase current limit candidate value $I_{d1}$ is larger than the absolute value of the second d-phase current limit candidate value $I_{d2}$, the second q-phase current limit candidate value $I_{q2}$ is selected as the q-phase current limit value $I_{qo1}$ to be used when creating the q-phase current command $i_q$. If the q-phase current command $i_q$ created based on the torque command exceeds the q-phase current limit value $I_{qo1}$, the q-phase current command unit 13 limits the q-phase current command $i_q$ to the q-phase current limit value $I_{qo1}$ and outputs the thus limited q-phase current command.

The d-phase current command unit 14 shown in FIG. 1 creates the d-phase current command $i_d$ based on the motor speed ω and the q-phase current command $i_q$. The following equation (16) is used to create the d-phase current command $i_d$. The equation (16) is identical to the earlier given equation (1), and will not be described in detail here.

$$I_d = \frac{-\Psi_a + \sqrt{\left(\frac{V_{om}}{\omega}\right)^2 - (L_q i_q)^2}}{L_d} \quad (16)$$

In the first embodiment, the d-phase current limit value $I_{do1}$ that the d-phase current command unit 14 uses when creating the d-phase current command $i_d$ is selected from among the first d-phase current limit candidate value $I_{d1}$ and the second d-phase current limit candidate value $I_{d2}$. More specifically, the d-phase current command unit 14 compares the first d-phase current limit candidate value $I_{d1}$ and the second d-phase current limit candidate value $I_{d2}$, and if the absolute value of the first d-phase current limit candidate value $I_{d1}$ is smaller than the absolute value of the second d-phase current limit candidate value $I_{d2}$, the first d-phase current limit candidate value $I_{d1}$ is selected as the d-phase current limit value $I_{do1}$ to be used when creating the d-phase current command $i_d$. On the other hand, if the absolute value of the first d-phase current limit candidate value $I_{d1}$ is larger than the absolute value of the second d-phase current limit candidate value $I_{d2}$, the second d-phase current limit candidate value $I_{d2}$ is selected as the d-phase current limit value $I_{do1}$ to be used when creating the d-phase current command $i_d$. If the d-phase current command $i_d$ created based on the motor speed ω and the q-phase current command $i_q$ by using the equation (16) exceeds the d-phase current limit value $I_{do1}$, the d-phase current command unit 14 limits the d-phase current command $i_d$ to the d-phase current limit value $I_{do1}$ and outputs the thus limited d-phase current command.

Figure 2:
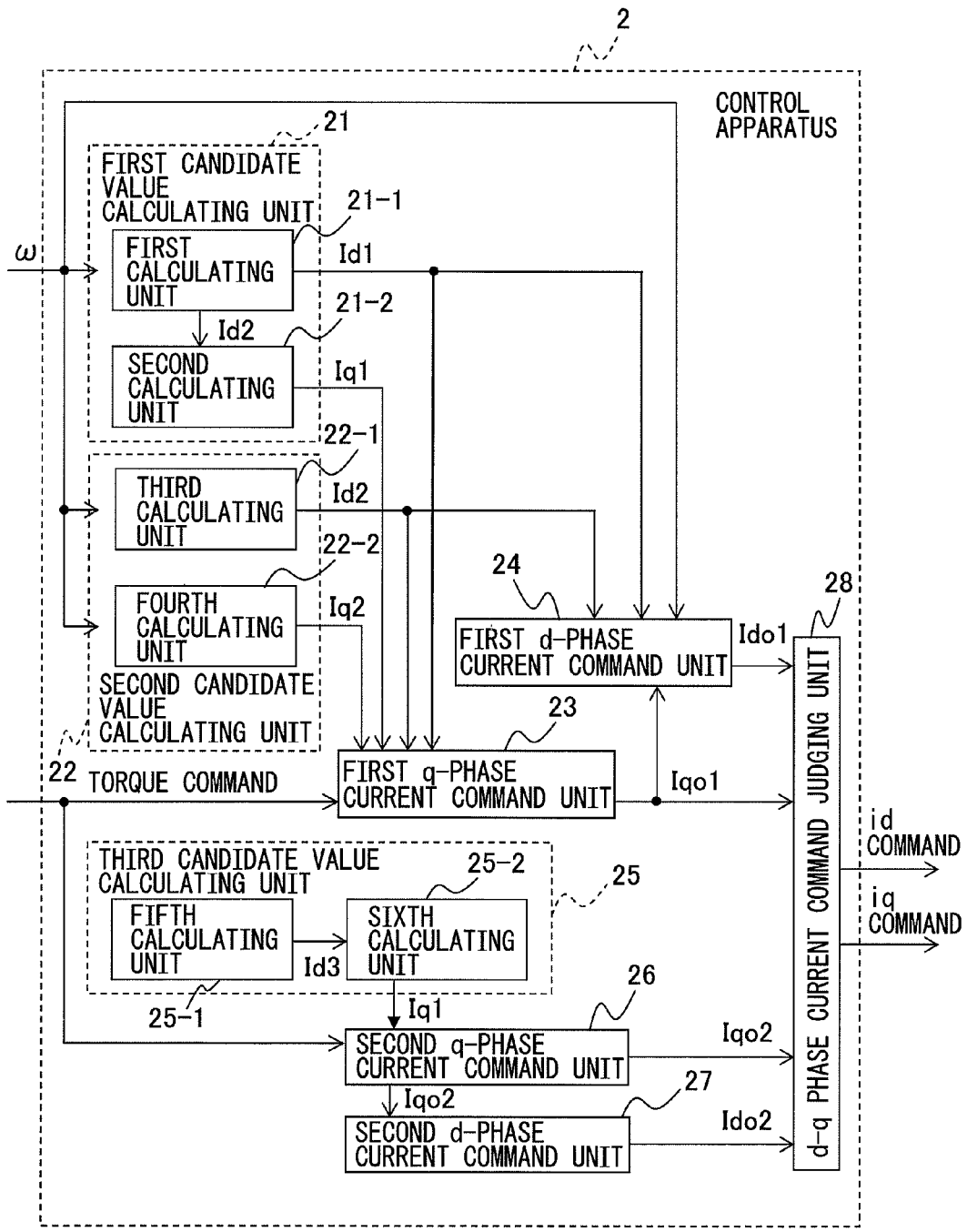
FIG. 2 is a basic functional block diagram of a synchronous motor control apparatus according to a second embodiment.

FIG. 2 is a basic functional block diagram of the synchronous motor control apparatus according to the second embodiment.

The synchronous motor control apparatus 2 that performs current vector control of the permanent-magnet synchronous motor based on the q-phase and d-phase current commands according to the second embodiment includes: a first candidate value calculating unit 21 which calculates a first d-phase current limit candidate value and a first q-phase current limit candidate value by using the motor speed of the synchronous motor and a control apparatus current limit value and control apparatus voltage limit value preset in the control apparatus 2; a second candidate value calculating unit 22 which calculates a second d-phase current limit candidate value and a second q-phase current limit candidate value by using the motor speed of the synchronous motor and the control apparatus voltage limit value; a first q-phase current command unit 23 which, if the absolute value of the first d-phase current limit candidate value is smaller than the absolute value of the second d-phase current limit candidate value, then sets the first q-phase current limit candidate value as a q-phase current limit value, but otherwise sets the second q-phase current limit candidate value as the q-phase current limit value and, if a first q-phase current command candidate value created based on a torque command exceeds the q-phase current limit value, then limits the first q-phase current command candidate value to the q-phase current limit value and outputs the thus limited first q-phase current command candidate value; a first d-phase current command unit 24 which, if the absolute value of the first d-phase current limit candidate value is smaller than the absolute value of the second d-phase current limit candidate value, then sets the first d-phase current limit candidate value as a d-phase current limit value, but otherwise sets the second d-phase current limit candidate value as the d-phase current limit value and, if a first d-phase current command candidate value created based on the motor speed ω and the first q-phase current command exceeds the d-phase current limit value, then limits the first d-phase current command candidate value to the d-phase current limit value and outputs the thus limited first d-phase current command candidate value; a third candidate value calculating unit 25 which calculates a third d-phase current limit candidate value and a third q-phase current limit candidate value, based on points of intersection at which a maximum torque/current curve representing a current vector locus that maximizes generated torque for the same current on a d-q current coordinate plane intersects a current limiting circle representing a current vector locus that the control apparatus current limit value describes; a second q-phase current command unit 26 which, if a second q-phase current command candidate value created based on the torque command exceeds the third q-phase current limit candidate value, then limits the second q-phase current command candidate value to the third q-phase current limit value and outputs the thus limited second q-phase current command candidate value; a second d-phase current command unit 27 which outputs a second d-phase current command candidate value that is created by using the second q-phase current command candidate value output from the second q-phase current command unit 26 and the maximum torque/current curve representing on the d-q current coordinate plane the current vector locus that maximizes generated torque for the same current; and a d-q phase current command judging unit 28 which, if the absolute value of the second d-phase current command candidate value is larger than the absolute value of the first d-phase current command candidate value, then outputs the second d-phase current command candidate value and the second q-phase current command candidate value, otherwise outputs the first d-phase current command candidate value and the first q-phase current command candidate value, as the d-phase current command and the q-phase current command, respectively. The q-phase and d-phase current commands output from the d-q phase current command judging unit 28 are thereafter converted to three-phase current commands. The three-phase current commands are sent to an inverter apparatus that drives the synchronous motor, and based on the received current commands, the inverter apparatus controls the switching operations of its internal semiconductor switching devices to generate desired three-phase drive power which is supplied to the synchronous motor.

The synchronous motor control apparatus 2 of the second embodiment differs from the synchronous motor control apparatus 1 of the first embodiment in that the q-phase current command unit 13 and the d-phase current command unit 14 are replaced by the first q-phase current command unit 23 and the first d-phase current command unit 24, respectively, and in that the third candidate value calculating unit 25, the second q-phase current command unit 26, the second d-phase current command unit 27, and the d-q phase current command judging unit 28 are added.

The first candidate value calculating unit 21 and second candidate value calculating unit 22 shown in FIG. 2 are identical to the first candidate value calculating unit 11 and second candidate value calculating unit 12 described with reference to FIG. 1, and therefore will not be further described herein.

The first q-phase current command unit 23 and first d-phase current command unit 24 shown in FIG. 2 correspond to the q-phase current command unit 13 and d-phase current command unit 14 described with reference to FIG. 1, and their operating principles are the same. That is, the q-phase current command output from the q-phase current command unit 13 in the first embodiment need only be replaced by the first q-phase current command candidate value output from the first q-phase current command unit 23 in the second embodiment, and the d-phase current command output from the d-phase current command unit 14 in the first embodiment need only be replaced by the first d-phase current command candidate value output from the first d-phase current command unit 24 in the second embodiment.

The following description deals with the third candidate value calculating unit 25, the second q-phase current command unit 26, the second d-phase current command unit 27, and the d-q phase current command judging unit 28, which are not included in the first embodiment but included in the second embodiment.

The third candidate value calculating unit 25 calculates the third d-phase current limit candidate value and the third q-phase current limit candidate value, based on the points of intersection at which the maximum torque/current curve representing the current vector locus that maximizes generated torque for the same current on the d-q current coordinate plane intersects the current limiting circle representing the current vector locus that the control apparatus current limit value describes.

The optimum current phase that satisfies the condition that maximizes generated torque for the same current is given as shown by the following equation (17) by partially differentiating the equation of the torque, i.e., the previously given equation (9), with respect to β and equating it to 0. Here, $I_a$ denotes the amplitude of the current, and β the phase of the current.

$$\beta = \sin^{-1}\left\{\frac{-\Psi_a + \sqrt{\Psi_a^2 + 8(L_q - L_d)^2 I_a^2}}{4(L_q - L_d)I_a}\right\} \tag{17}$$

From equation (17), the relationship between the q-phase current $i_q$ and the d-phase current $i_d$ is given as shown by the following equation (18).

$$i_d = \frac{\Psi_a}{2(L_q - L_d)} - \sqrt{\frac{\Psi_a^2}{4(L_q - L_d)^2} + i_q} \tag{18}$$

That is, on the d-q current coordinate plane, the curve that represents the relationship between the q-phase current $i_q$ and the d-phase current $i_d$, that satisfies the above equation (18) is the curve that maximizes generated torque for the same current, and herein referred to as the "maximum torque/current curve". In the second embodiment, the third candidate value calculating unit 25 calculates the third d-phase current limit candidate value $I_{d3}$ and the third q-phase current limit candidate value $I_{q3}$, based on the points of intersection at which the maximum torque/current curve representing the current vector locus that maximizes generated torque for the same current on the d-q current coordinate plane intersects the current limiting circle representing the current vector locus that the control apparatus current limit value describes.

A fifth calculating unit 25-1 in the third candidate value calculating unit 25 calculates the third d-phase current limit candidate value $I_{d3}$ in accordance with the following equation (19) obtained from the equation (3) that expresses the current limiting circle and the equation (18) that expresses the maximum torque/current curve.

$$I_{d3} = \frac{\Psi_a}{4(L_q - L_d)} - \sqrt{\frac{\Psi_a^2}{16(L_q - L_d)^2} + \frac{I_{am}^2}{2}} \tag{19}$$

A sixth calculating unit 25-2 in the third candidate value calculating unit 25 calculates the third q-phase current limit candidate value $I_{q3}$ in accordance with the following equation (20) generated by transforming the equation (3) that expresses the current limiting circle.

$$I_{q1} = \sqrt{I_{am}^2 - 1I_{d1}^2} \tag{20}$$

The second q-phase current command unit 26 shown in FIG. 2 creates the q-phase current command candidate value $I_{qo2}$ based on the torque command. In the second embodiment, the third q-phase current limit value $I_{q3}$ is set as the q-phase current limit value $I_{qo2}$ that the second q-phase current command unit 26 uses when creating the q-phase current command candidate value $I_{qo2}$. If the second q-phase current command candidate value $I_{qo2}$ created based on the torque command exceeds the third q-phase current limit value $I_{q3}$, the second q-phase current command unit 26 limits the second q-phase current command candidate value $I_{qo2}$ to the third q-phase current limit value $I_{q3}$ and outputs the thus limited second q-phase current command candidate value.

The second d-phase current command unit 27 shown in FIG. 2 outputs the second d-phase current command candidate value $I_{do2}$ that is created by using the second q-phase current command candidate value $I_{qo2}$ output from the second q-phase current command unit 26 and the maximum torque/current curve representing on the d-q current coordinate plane the current vector locus that maximizes generated torque for the same current. The following equation (21) is used to create the second d-phase current command candidate value $I_{do2}$. The equation (21) is identical to the earlier given equation (18).

$$i_d = \frac{\Psi_a}{2(L_q - L_d)} - \sqrt{\frac{\Psi_a^2}{4(L_q - L_d)^2} + i_q} \tag{21}$$

The d-q phase current command judging unit 28 shown in FIG. 2 selects the q-phase current command $i_q$ and d-phase current command $i_d$ to be finally output, from among the first q-phase current command candidate value $I_{qo1}$ and first d-phase current command candidate value $I_{do1}$ supplied from the first q-phase current command unit 23 and first d-phase current command unit 24 and the second q-phase current command candidate value $I_{qo2}$ and second d-phase current command candidate value $I_{do2}$ supplied from the second q-phase current command unit 26 and second d-phase current command unit 27. A determination as to which candidate values are to be selected is made based on the first d-phase current command candidate value $I_{do1}$ and the second d-phase current command candidate value $I_{do2}$. More specifically, the d-q phase current command judging unit 28 compares the first d-phase current command candidate value $I_{do1}$ and the second d-phase current command candidate value $I_{do2}$, and if the absolute value of the second d-phase current command candidate value $I_{do2}$ is larger than the absolute value of the first d-phase current command candidate value $I_{do1}$, the second q-phase current command candidate value $I_{qo2}$ and second d-phase current command candidate value $I_{do2}$ are selected as the q-phase current command $i_q$ and d-phase current command $i_d$ to be finally output, and the thus selected commands are output. On the other hand, if the absolute value of the second d-phase current command candidate value $I_{do2}$ is smaller than the absolute value of the first d-phase current command candidate value $I_{do1}$, the first q-phase current command candidate value $I_{qo1}$ and first d-phase current command candidate value $I_{do1}$ are selected as the q-phase current command $i_q$ and d-phase current command $i_d$ to be finally output, and the thus selected commands are output.

Figure 3:
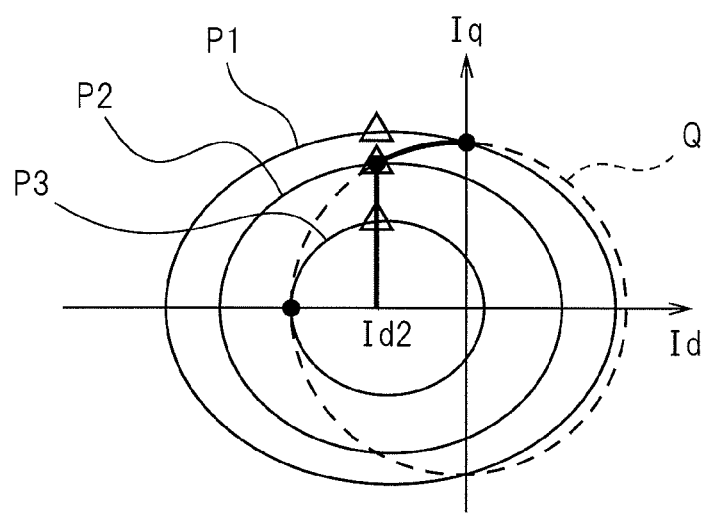
FIG. 3 is a diagram showing a d-q current coordinate plane for explaining how switching is effected based on a q-phase current limit value and a d-phase current limit value in the synchronous motor control apparatus according to the first and second embodiments.

Maximizing the generated torque is one of the key objectives in developing the synchronous motor, but since the torque is proportional to the q-phase current $i_q$, it is desirable to maximize the torque while performing control so that the q-phase current $i_q$ exceeds neither the voltage limit nor the current limit. The generated torque of the synchronous motor is limited by the current limit of the inverter apparatus used to drive the synchronous motor and the voltage limit determined by the input supply voltage, etc. In the first and second embodiments, when the synchronous motor is driven within a range that does not reach the current limit or the voltage limit, reluctance torque control is performed that maximizes the sum of the magnet torque and reluctance torque of the synchronous motor, while on the other hand, when driving the synchronous motor in a region where the current limit is applied, flux weakening control is performed to maximize the torque of the synchronous motor. In the first and second embodiments, since either the reluctance torque control or the flux weakening control, whichever maximizes the generated torque, is employed, the absolute value of the first d-phase current limit value $I_{d1}$ is compared with the absolute value of the second d-phase current limit value $I_{d2}$ to determine whether the reluctance torque control or the flux weakening control is to be effected. FIG. 3 is a diagram showing the d-q current coordinate plane for explaining how switching is effected based on the q-phase current limit value and the d-phase current limit value in the synchronous motor control apparatus according to the first and second embodiments. In FIG. 3, the voltage limiting ellipses representing the current vector loci of the control apparatus voltage limit values for motor speeds $\omega_1$, $\omega_2$, and $\omega_3$ (where $\omega_1<\omega_2<\omega_3$) are designated by $P_1$, $P_2$, and $P_3$, respectively, and the current limiting circle representing the current vector locus that the control apparatus current limit value describes is designated by Q. The first candidate value calculating unit 11, 21 calculates the first q-phase current limit candidate value $I_{q1}$ and the first d-phase current limit candidate value $I_{d1}$ by taking the q and d coordinates of each of the points (indicated by solid circles "•" in the figure) at which the current limiting circle Q intersects the respective voltage limiting ellipses $P_1$, $P_2$, and $P_3$. On the other hand, the second candidate value calculating unit 12, 22 calculates the second q-phase current limit candidate value $I_{q2}$ and the second d-phase current limit candidate value $I_{d2}$ by taking the q and d coordinates of each of the points (indicated by rectangles "Δ" in the figure) at which the current limiting circle Q intersects the maximum torque/flux curve representing the current vector locus that maximizes the torque for the same flux linkage. In the illustrated example, the maximum torque/flux curve is shown as being a constant value $I_{d2}$ for illustrative purposes. As can be seen from FIG. 3, when the absolute value of the first d-phase current limit candidate value $I_{d1}$ is smaller than the absolute value of the second d-phase current limit candidate value $I_{d2}$, the first q-phase current limit candidate value $I_{q1}$ and the first d-phase current limit candidate value $I_{d1}$ are employed as the q-phase current limit value and the d-phase current limit value, respectively, and when the absolute value of the first d-phase current limit candidate value $I_{d1}$ is larger than the absolute value of the second d-phase current limit candidate value $I_{d2}$, the second q-phase current limit candidate value $I_{q2}$ and the second d-phase current limit candidate value $I_{d2}$ are employed as the q-phase current limit value and the d-phase current limit value, respectively; in this way, since the q-phase current command can be limited by the largest possible limit value, the generated torque proportional to the q-phase current can be maximized.

Figure 4A:
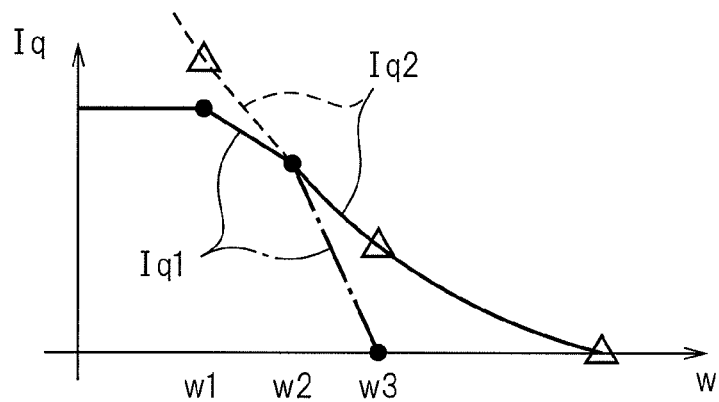
FIG. 4a is a diagram showing q-phase and d-phase currents, more specifically q-phase current, as a function of motor speed when the q-phase current limit value and the d-phase current limit value have the relationship shown in FIG. 3.
Figure 4B:
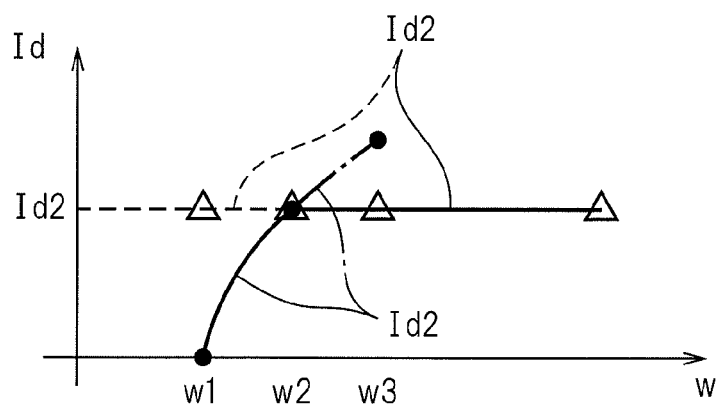
FIG. 4b is a diagram showing q-phase and d-phase currents, more specifically d-phase current, as a function of motor speed when the q-phase current limit value and the d-phase current limit value have the relationship shown in FIG. 3.

FIG. 4a is a diagram showing the q-phase and d-phase currents, more specifically the q-phase current, as a function of the motor speed when the q-phase current limit value and the d-phase current limit value have the relationship shown in FIG. 3. FIG. 4b is a diagram showing the q-phase and d-phase currents, more specifically the d-phase current, as a function of the motor speed when the q-phase current limit value and the d-phase current limit value have the relationship shown in FIG. 3. When the motor speed is less than $\omega_2$, if the second q-phase current limit candidate value $I_{q2}$ and the second d-phase current limit candidate value $I_{d2}$ are employed as the current limit values, the control apparatus current limit value $I_{am}$ will be exceeded. Accordingly, in this case, the first q-phase current limit candidate value $I_{q1}$ and the first d-phase current limit candidate value $I_{d1}$ are employed as the current limit values. On the other hand, when the motor speed is not less than $\omega_2$, since the second q-phase current limit candidate value $I_{q2}$, which is the q-axis component related to the magnitude of the generated torque, is larger than the first q-phase current limit candidate value $I_{q1}$, the second q-phase current limit candidate value $I_{q2}$ and the second d-phase current limit candidate value $I_{d2}$ are employed that can generate a greater torque.

In the first and second embodiments, the current limit candidate values have been calculated and the q-phase and d-phase current commands determined based on theoretical equations; by contrast, in the third embodiment to be described hereinafter, the q-phase and d-phase current commands are determined by substituting various parameters of the synchronous motor and various kinds of data obtained from the actual operation of the synchronous motor into approximate equations.

In the third embodiment, first, for the q-phase current limit value, the third candidate value calculating unit 25 may calculate the third q-phase current limit candidate value $I_{q3}$ in accordance with an approximate equation expressed as a third q-phase current limit candidate value $I_{q3\text{-}approx}$ as shown by the following equation (22).

$$i_{q3}\text{-approx} = c_1 \qquad (22)$$

The first candidate value calculating unit 11, 21 and the second candidate value calculating unit 12, 22 may calculate the first q-phase current limit candidate value $I_{q1}$ and the second q-phase current limit candidate value $I_{q2}$, respectively, in accordance with an approximate equation expressed as a quadratic function whose variable is the motor speed ω of the synchronous motor. As an example, it is assumed here that the first q-phase current limit candidate value and the second q-phase current limit candidate value (collectively designated as $I_{q12\text{-}approx}$) are calculated using an approximate equation such as shown by the following equation (23).

$$i_{q12}\text{-approx} = (a_2\omega^2 + b_2\omega + c_2) \qquad (23)$$

For the q-phase current, the absolute values of the candidate values $I_{q3\text{-}approx}$ and $I_{q12\text{-}approx}$ calculated by the approximate equations as shown above are compared, and the smaller value is taken as the q-phase current limit value $i_{q\text{-}lim}$.

Next, for the d-phase current limit value, the third candidate value calculating unit 25 may calculate the third d-phase current limit candidate value $I_{d3}$ in accordance with an approximate equation expressed as third d-phase current limit candidate value $I_{d3\text{-}approx}$ as shown by the following equation (24).

$$i_{d3\_approx} = c_3 \qquad (24)$$

The first candidate value calculating unit 11, 21 and the second candidate value calculating unit 12, 22 may calculate the first d-phase current limit candidate value $I_{d1}$ and the second d-phase current limit candidate value $I_{d2}$, respectively, in accordance with an approximate equation expressed as a quadratic function whose variable is the motor speed ω of the synchronous motor. As an example, the first d-phase current limit candidate value $I_{d1\text{-}approx}$ is calculated using an approximate equation such as shown by the following equation (25). On the other hand, for the second d-phase current limit candidate value $I_{d2\text{-}approx}$, it is assumed that the value calculated in accordance with the approximate equation is a constant (the coefficients of the second-degree and first-degree terms of the motor speed ω are both 0) as shown by the following equation (26).

$$i_{d1\_approx} = (a_4\omega^2 + b_4\omega + c_4) \qquad (25)$$

$$i_{d2\_approx} = c_5 \qquad (26)$$

For the d-phase current, the absolute values of the candidate values $I_{d3\text{-}approx}$ and $I_{d1\text{-}approx}$ calculated by the approximate equations as shown above are compared; if the absolute value of $I_{d3\text{-}approx}$ is larger than the absolute value of $I_{d1\text{-}approx}$, $I_{d3\text{-}approx}$ is set as the d-phase current limit value and if the absolute value of $I_{d1\text{-}approx}$ is larger than the absolute value of $I_{d2\text{-}approx}$, $I_{d2\text{-}approx}$ is set as the d-phase current limit value otherwise $I_{d1\text{-}approx}$ is set as the d-phase current limit value $i_{d\text{-}lim}$.

Next, a description will be given of how the q-phase and d-phase current commands are determined by using approximate equations.

The second d-phase command unit 27 calculates the second d-phase current command candidate value $i_{d2\text{-}approx}^*$ in accordance with an approximate equation expressed as a quadratic function whose variable is the second q-phase current command candidate value $i_{q2}$ output from the second q-phase current command unit 26, as shown by the following equation (27).

$$i_{d2}^*\_approx = d_6 i_{q2}^2 + e_6 i_{q2} + f_6 \qquad (27)$$

The d-phase current command unit 14 and the first d-phase current command unit 24 calculate the d-phase current command and the first d-phase current command candidate value $i_{d1}$, respectively, in accordance with an approximate equation given by the following equation (28), where ω represents the motor speed of the synchronous motor, $i_{q1}$ denotes the q-phase current command or the first q-phase current command candidate value output from the q-phase current command unit 13 or the first q-phase current command unit 23, respectively, and $a_7$, $b_7$, $c_7$, $d_7$, $e_7$, $f_7$, and $g_7$ are given coefficients.

$$i_{d1}^*\_approx = (a_7 w^2 + b_7 w + c) \times (d_7 i_q + e_7 i_q + f_7) - g_7 \qquad (28)$$

If the absolute value of the d-phase current command or first d-phase current command candidate value $i_{d1}$ is larger than the absolute value of the d-phase current limit value $i_{d\text{-}lim}$, the d-phase current command or first d-phase current command candidate value $i_{d1}$ is limited to that limit value.

Figure 5:
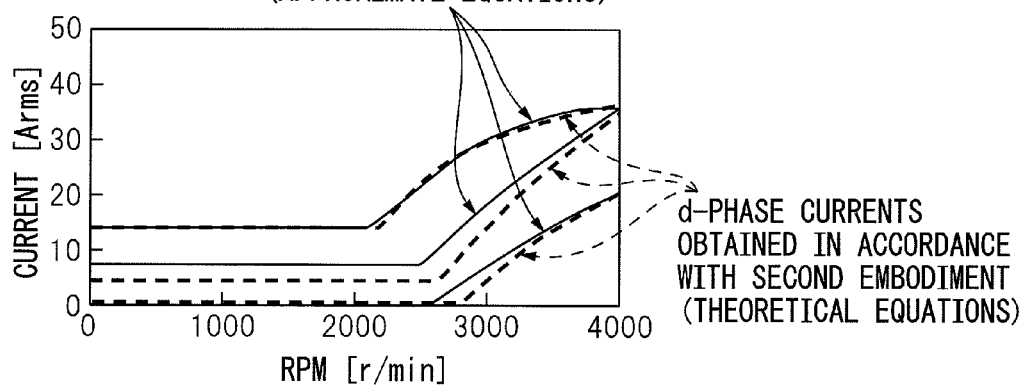
FIG. 5 is a diagram showing the results of the comparison of the d-phase currents obtained in accordance with the second and third embodiments, respectively.
Figure 6:
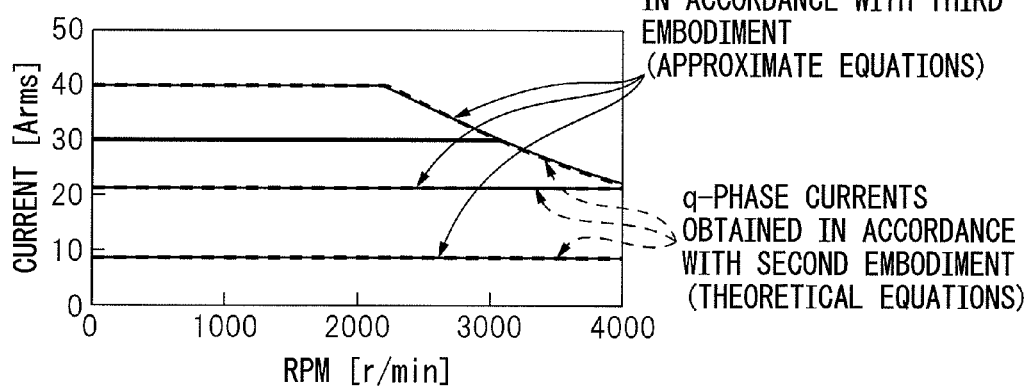
FIG. 6 is a diagram showing the results of the comparison of the q-phase currents obtained in accordance with the second and third embodiments, respectively.
Figure 7:
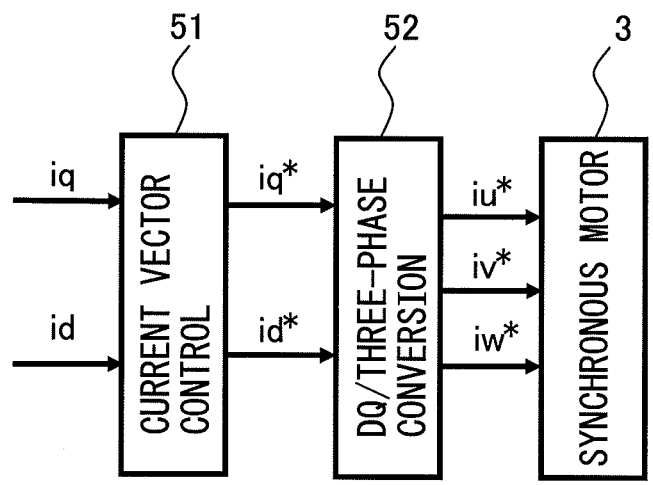
FIG. 7 is a schematic diagram for explaining how the q-phase and d-phase current commands used for vector current control of a synchronous motor are related to three-phase current commands.
Figure 8:
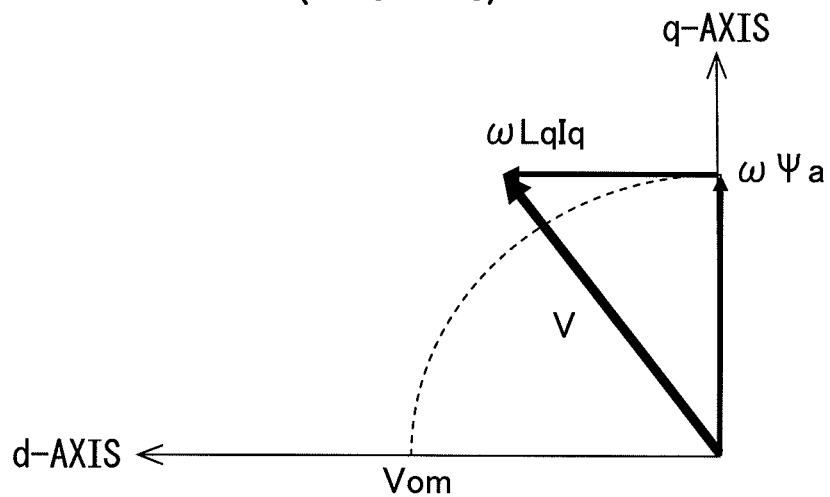
FIG. 8 is a vector diagram for explaining voltages generated in a permanent-magnet synchronous motor.
Figure 9:
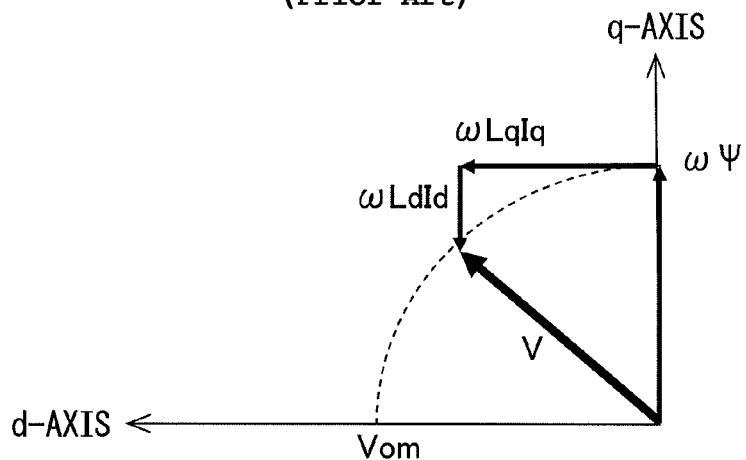
FIG. 9 is a vector diagram for explaining a servo motor current control method disclosed in Japanese Unexamined Patent Publication No. H09-084400.
Figure 10:
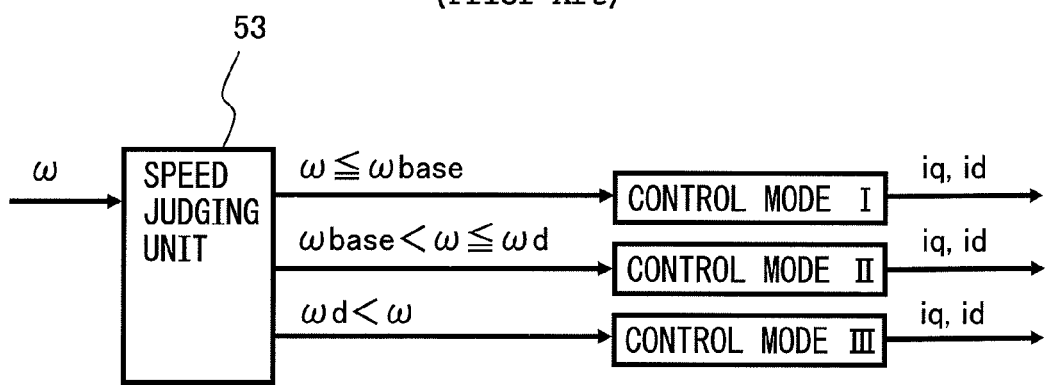
FIG. 10 is a schematic diagram for explaining the method of controlling a synchronous motor having a plurality of control modes described in a document "Design and Control of Interior Permanent Magnet Synchronous Motor".

FIG. 5 is a diagram showing the results of the comparison of the d-phase currents obtained in accordance with the second and third embodiments, respectively, and FIG. 6 is a diagram showing the results of the comparison of the q-phase currents obtained in accordance with the second and third embodiments, respectively. In FIGS. 5 and 6, the relationships between the motor speed ω and the d-phase current $i_d$ and q-phase current $i_q$ calculated in accordance with the second embodiment and the relationships between the motor speed ω and the d-phase current $i_d$ and q-phase current $i_q$ calculated in accordance with the approximate equations of the third embodiment are shown for the three-phase permanent-magnet synchronous motor when per-phase armature flux linkage $\Psi_a$=0.0965 $V_p$ sec/rad, q-axis inductance Lq=0.00217 H, d-axis inductance Ld=0.0013 H, voltage limit $V_o$=200 Vrms, and current limit $I_{am}$=42.4 Arms. The coefficients in equations (22) to (28) are set as follows: $c_1$=39.69, $a_2$=0.0001539, $b_2$=−0.1938, $c_2$=76.18, $c_3$=15, $a_4$=−0.0002477, $b_4$=0.3112, $c_4$=−42.78, $c_5$=36, $d_6$=1, $e_6$=0.142, $f_6$=0.4, $a_7$=−0.0001267, $b_7$=0.1592, $c_7$=−18, $d_7$=1.2, $e_7$=0, $f_7$=1, and $g_7$=30. As can be seen from FIGS. 5 and 6, the synchronous motor control apparatus can be sufficiently modeled by the approximate equations of the third embodiment, even when compared with the second embodiment.

The coefficients used in equations (22) to (28) should be set by measuring in advance characteristic values such as the back electromotive force and inductance of the synchronous motor for each individual motor. By varying the coefficients in accordance with the values measured on each particular motor, it is possible to perform control with higher output and higher efficiency that matches that particular synchronous motor. If the characteristic values measured on each particular motor are prestored in a memory or the like attached to that particular synchronous motor, the coefficients can be readily set by merely connecting the synchronous motor to the control apparatus of the present invention. Alternatively, the apparatus may further include a coefficient setting unit (not shown) that sets the coefficients to be used in the functions expressed by the above approximate equations, in response to the input voltage supplied to the synchronous motor and detected by a voltage detection sensor provided at the power input terminal of the synchronous motor. Further alternatively, the apparatus may further include a coefficient setting unit that sets the coefficients to be used in the functions expressed by the above approximate equations, in response to the temperature of the synchronous motor detected by a temperature sensor provided in the vicinity of the synchronous motor.

Each component unit of the control apparatus described above is implemented by a processor or the like incorporated in the synchronous motor control apparatus.

The present invention can be applied to a control apparatus for a permanent-magnet synchronous motor. Particularly, in the case of a synchronous motor with a permanent magnet mounted on the surface of its rotor (SPMSM), since no reluctance torque is generated, it is advantageous to use the synchronous motor control apparatus of the first embodiment from the viewpoint of efficiency.

According to the present invention, a synchronous motor control apparatus can be achieved that can control a permanent-magnet synchronous motor in a stable manner by creating at high speed the q-phase and d-phase current commands used for current vector control of the synchronous motor. That is, since the computation of the q-phase and d-phase current commands does not involve control mode switching based on the motor speed, interruption of current flow does not occur when switching the control mode, and thus the problem of synchronous motor vibration does not occur. Furthermore, since the mathematical equations used for control are not complex, the computation speed can be enhanced, and the synchronous motor can be controlled in a further stable manner.

What is claimed is:

1. A synchronous motor control apparatus that performs current vector control of a permanent-magnet synchronous motor based on a q-phase current command and a d-phase current command, comprising:
   a first candidate value calculating unit which, using the motor speed of said synchronous motor and a control apparatus current limit value and control apparatus voltage limit value preset in said control apparatus, calculates a first d-phase current limit candidate value and a first q-phase current limit candidate value, based on points of intersection at which a current limiting circle representing a current vector locus that said control apparatus current limit value describes on a d-q current coordinate plane intersects a voltage limiting ellipse representing a current vector locus that said control apparatus voltage limit value describes as a function of said motor speed;
   a second candidate value calculating unit which, using the motor speed of said synchronous motor and said control apparatus voltage limit value, calculates a second d-phase current limit candidate value and a second q-phase current limit candidate value, based on points of intersection at which a maximum torque/flux curve representing a current vector locus that maximizes torque for the same flux linkage on said d-q current coordinate plane intersects said voltage limiting ellipse representing the current vector locus that said control apparatus voltage limit value describes as a function of said motor speed;
   a q-phase current command unit which, when the absolute value of said first d-phase current limit candidate value is smaller than the absolute value of said second d-phase current limit candidate value, then sets said first q-phase current limit candidate value as a q-phase current limit value, but otherwise sets said second q-phase current limit candidate value as the q-phase current limit value and, when said q-phase current command created based on a torque command exceeds said q-phase current limit value, then limits said q-phase current command to said q-phase current limit value and outputs said limited q-phase current command; and
   a d-phase current command unit which, when the absolute value of said first d-phase current limit candidate value is smaller than the absolute value of said second d-phase current limit candidate value, then sets said first d-phase current limit candidate value as a d-phase current limit value, but otherwise sets said second d-phase current limit candidate value as the d-phase current limit value and, when said d-phase current command created based on said motor speed and said q-phase current command exceeds said d-phase current limit value, then limits said d-phase current command to said d-phase current limit value and outputs said limited d-phase current command.

2. The synchronous motor control apparatus according to claim 1, wherein denoting the motor speed of said synchronous motor by $\omega$, armature flux linkage by $\Psi_a$, q-axis and d-axis inductances by $L_q$ and $L_d$, respectively, said control apparatus voltage limit value by $V_{om}$, said control apparatus current limit value by $I_{am}$, said first d-phase current limit candidate value by $I_{d1}$, and said first q-phase current limit candidate value by $I_{q1}$, said first candidate value calculating unit calculates said first d-phase current limit candidate value $I_{d1}$ in accordance with equation $$I_{d1} = \frac{\Psi_a L_d - \sqrt{(\Psi_a L_d)^2 + (L_q^2 - L_d^2)\left\{\Psi_a^2 + (L_q I_{am})^2 - \left(\frac{V_{om}}{\omega}\right)^2\right\}}}{L_q^2 - L_d^2}$$

and calculates said first q-phase current limit candidate value $I_{q1}$ in accordance with equation $$I_{Q1} = \sqrt{I_{am}^2 - I_{d1}^2}.$$

3. The synchronous motor control apparatus according to claim 1, wherein denoting the motor speed of said synchronous motor by $\omega$, armature flux linkage by $\Psi_a$, q-axis and d-axis inductances by $L_q$ and $L_d$, respectively, said control apparatus voltage limit value by $V_{om}$, said second d-phase current limit candidate value by $I_{d2}$, and said second q-phase current limit candidate value by $I_{q2}$, said second candidate value calculating unit calculates said second d-phase current limit candidate value $I_{d2}$ in accordance with equations $$\Delta\Psi_d = \frac{-L_q\Psi_a + \sqrt{(L_q\Psi_a)^2 + 8(L_q - L_d)^2\left(\frac{V_{om}}{\omega}\right)^2}}{4(L_q - L_d)}$$

$$I_{d2} = \frac{\Psi_a + \Delta\Psi_d}{L_d}$$

and calculates said second q-phase current limit candidate value $I_{q2}$ in accordance with equation $$I_{q2} = \frac{\sqrt{\left(\frac{V_{om}}{\omega}\right)^2 - (\Delta\Psi_d)^2}}{L_q}$$

4. The synchronous motor control apparatus according to claim 1, wherein denoting the motor speed of said synchronous motor by $\omega$, said q-phase current command output from said q-phase current command unit by $i_{q1}$, given coefficients by a, b, c, d, e, f, and g, and said d-phase current command by $i_{d1}$, said d-phase current command unit calculates said d-phase current command $i_{d1}$ in accordance with an approximate equation given by $$i_{d1} = (a\omega^2 + b\omega + c) \times (di_{q1}^2 + ei_{q1} + f) - g.$$

5. The synchronous motor control apparatus according to claim 1, wherein said first candidate value calculating unit and said second candidate value calculating unit calculate said first d-phase current limit candidate value, said first q-phase current limit candidate value, and said second q-phase current limit candidate value, respectively, in accordance with an approximate equation expressed as a quadratic function whose variable is the motor speed of said synchronous motor.

6. The synchronous motor control apparatus according to claim 4, further comprising a coefficient setting unit which sets coefficients to be used in a function expressed by said approximate equation, in response to an input voltage supplied to said synchronous motor and detected by a voltage detection sensor provided at a power input terminal of said synchronous motor.

7. The synchronous motor control apparatus according to claim 4, further comprising a coefficient setting unit which sets coefficients to be used in a function expressed by said approximate equation, in response to the temperature of said synchronous motor detected by a temperature sensor provided in the vicinity of said synchronous motor.

\* \* \* \* \*